United States Patent [19]

Brown et al.

[11] Patent Number: 4,589,818

[45] Date of Patent: May 20, 1986

[54] APPARATUS FOR ROTATING AND RECIPROCATING A TRANSFER MEMBER

[75] Inventors: John B. Brown, Clarkston; Reginald D. Kelley, Troy, both of Mich.

[73] Assignee: Force Control Industries, Inc., Fairfield, Ohio

[21] Appl. No.: 768,689

[22] Filed: Aug. 23, 1985

Related U.S. Application Data

[63] Continuation of Ser. No. 489,255, Apr. 27, 1983, abandoned.

[51] Int. Cl.$^4$ .............. B23Q 7/04; B65G 47/90; B25J 9/00
[52] U.S. Cl. .............. 414/744 A; 414/590; 414/4; 901/17; 901/23; 901/21
[58] Field of Search .............. 414/744, 590, 591, 738, 414/739, 1, 4, 7; 74/24; 198/339, 488; 901/31, 23, 17, 21

[56] References Cited

U.S. PATENT DOCUMENTS

| | | | |
|---|---|---|---|
| 2,692,693 | 10/1954 | Newberg | 414/744 A |
| 3,225,941 | 12/1965 | Slattery | 414/744 A X |
| 3,240,358 | 3/1966 | Ferguson | 414/744 A X |
| 4,293,268 | 10/1981 | Mink | 414/744 A X |
| 4,403,907 | 9/1983 | Koller et al. | 414/590 X |
| 4,455,120 | 6/1984 | Richter | 414/1 X |

*Primary Examiner*—Terrance L. Siemens
*Attorney, Agent, or Firm*—Jacox & Meckstroth

[57] ABSTRACT

A pair of clutch-brake units each include a housing confining a cooling oil and rotatably supporting an input shaft and an aligned output shaft with interfitting clutch plates and discs for connecting the aligned shafts and interfitting brake plates and discs for connecting the output shaft to the housing. Each housing also encloses an axially movable non-rotating actuating piston for selectively engaging the clutch and brake plates and discs, and the input shafts of the clutch-brake units are driven continuously by a common electric motor. The output shaft of one clutch-brake unit is connected by a first drive mechanism to raise and lower or reciprocate a vertical shaft supporting a head member which carries a transfer arm, and the output shaft of the other clutch-brake unit is connected by a second drive mechanism to oscillate the vertical shaft, head member and transfer arm.

14 Claims, 1 Drawing Figure

APPARATUS FOR ROTATING AND RECIPROCATING A TRANSFER MEMBER

This is a continuation, of application Ser. No. 489,255, filed Apr. 27, 1983, now abandoned.

BACKGROUND OF THE INVENTION

There have been many different types of apparatus or mechanisms constructed or proposed for automatically and successively transferring a supply of articles from one position to another position which may be at a different elevation in addition to being horizontally offset from the one position. For example, U.S. Pat. Nos. 3,857,496 and 4,134,305 show two different types of apparatus for producing rotation or oscillation of a transfer arm supported by a head member and also for producing vertical or linear movement of the arm or head member. In addition, many patents have issued in the field of robotics where usually a gripping mechanism is supported on the end of a transfer arm and is moved with universal movement in accordance with a preprogrammed control system. However, it has been found that none of the known prior art transfer apparatus provide for quickly transferring relatively heavy articles with precision and also provide high dependability of operation in addition to being relatively inexpensive to construct.

SUMMARY OF THE INVENTION

The present invention is directed to an improved mechanism or apparatus for producing compound linear and rotary movement of a head member which is adapted to carry a transfer arm for successively gripping a supply of relatively heavy articles and for quickly transferring each article to another position with high precision and dependability. That is, the apparatus of the invention will successively transfer a supply of heavy articles and will operate for hundreds of thousands of repetitive cycles without requiring down time for servicing. Thus the transfer apparatus of the invention is highly desirable for use in an automated production or assembly system wherein high dependability of transfer equipment is very desirable in order to avoid down time of the entire automated production system or assembly line. The transfer apparatus of the invention may also be quickly and conveniently changed or adjusted to vary the extent of transfer both in a linear direction and in a rotary direction so that the apparatus provides versatility and flexibility.

In accordance with one embodiment of the invention, a pair of oil-shear clutch-brake units each have aligned input and output shafts rotatably supported by a surrounding housing, and the input shafts of the units are continuously driven in timed relation, for example, by a common electric drive motor. The housing of each of the clutch-brake units encloses a set of interfitting annular clutch plates and discs for coupling the input shaft to the output shaft and also encloses a set of interfitting annular brake discs and plates for coupling or braking the output shaft to the housing. Oil is pumped between the discs and plates, and a nonrotating piston is supported within each housing for axial movement for selectively engaging the clutch discs and plates or the brake discs and plates.

The output shaft of one of the clutch-brake units drives a rotary cam through a gear reducer, and the cam produces oscillation of an arm which raises and lowers a vertical splined shaft on top of which is mounted a head member supporting a transfer arm. The output shaft of the other clutch-brake unit drives a rotary crank member or plate which reciprocates a rack engaging a pinion mounted on the splined shaft for oscillating the shaft and the head member. The rotation of the cam member and the rotation of the crank member are sensed by corresponding position indicators or rotary cam switches which are used to control fluid or air to the actuating pistons within the clutch brake units to produce precision vertical movement and oscillation of the head member and transfer arm. As a result, the mechanism provides for precision and dependable movement of a transfer arm having substantial load carrying ability.

Other features and advantages of the invention will be apparent from the following description, the accompanying drawing and the appended claims.

DESCRIPTION OF THE PREFERRED EMBODIMENT

Figure 1:
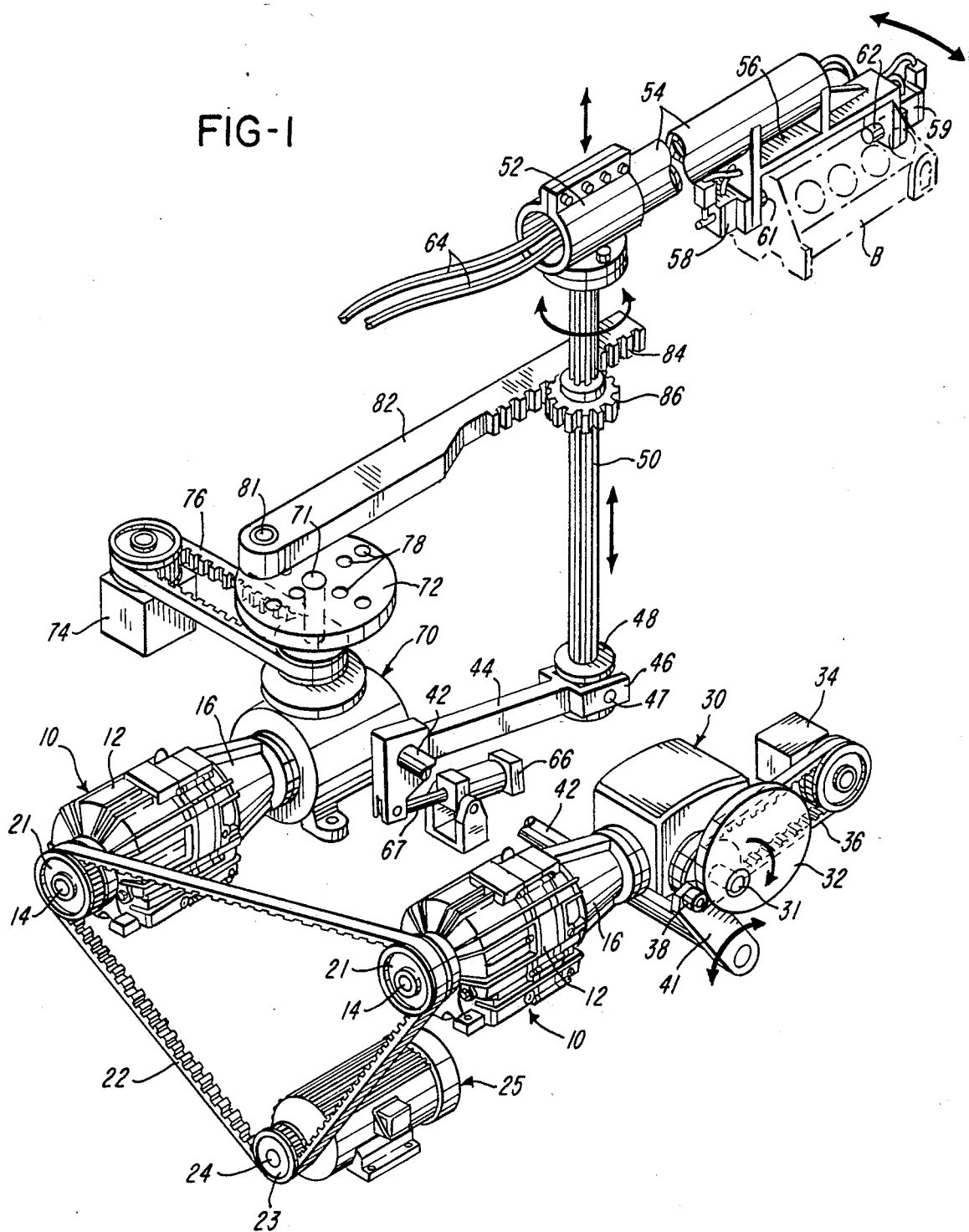
FIG. 1 is a somewhat diagrammatic perspective view of transfer apparatus constructed in accordance with the invention.

Referring to the drawing, a pair of oil-shear clutch-brake units 10 are constructed as disclosed in U.S. Pat. No. 3,924,715 or U.S. Pat. No. 3,638,773 which issued to the Assignee of the present invention. As shown in these patents which are incorporated by reference, each of the clutch-brake units includes a three section housing 12 which rotatably supports an input drive member or shaft 14 and an axially aligned output drive member or shaft surrounded by a coupling housing 16. As best shown in above U.S. Pat. No. 3,924,715, the input and output shafts of each clutch-brake unit 10 are connected through a set or series of interfitting annular clutch brakes and discs which are compressed or pressed together by axial movement of a non-rotating fluid actuated piston supported concentrically within the housing. Another set of interfitting annular brake plates and discs are adapted to couple the output shaft to the housing for braking the output shaft when the discs and plates are compressed together by movement of the non-rotating piston in the opposite direction by a set of compression springs and/or compressed fluid or air. The output shaft of each clutch-brake unit also incorporates an integrally formed pump impeller which extends within the clutch discs and the brake discs and is effective to circulate the oil within the housing between the interfitting discs and plates in response to rotation of the output shaft.

A pulley or sheave 21 is mounted on the input shaft 14 of each clutch-brake unit, and the sheaves 21 are connected by an endless geartype belt or tooth belt 22 to a sheave 23 mounted on the output shaft 24 of an electric motor 25 so that the input shafts 14 are driven in precise timed relation. As illustrated, the electric motor 25 is a variable speed DC motor for the purpose of demonstrating the operation of the transfer apparatus at various speeds. However, usually the motor 25 will be a constant speed AC electric motor. It is also within the scope of the invention to drive the input shafts 14 of the units 10 with separate electric motors which are coupled together by electrical control means.

The output shaft of the clutch-brake unit 10 shown on the right in FIG. 1, is connected by a flexible coupling (not shown) to the input shaft of a gear reducer 30 which has a driven output shaft 31 supporting a cam member 32. The output shaft 31 also drives a solid state rotary cam switch or shaft position indicator 34 through an endless timing belt drive 36. In one prototype assembly, the gear reducer 30 had a reduction ratio of 20:1.

A cam follower or roller 38 engages the contoured outer surface of the cam member 32 and is carried by an arm 41 mounted on a cross-shaft 42. The shaft 42 also supports and carries a crank arm 44 which is connected by a U-shaped yoke portion 46 and pins 47 to a rotary anti-friction bearing 48 mounted on the lower end portion of a vertical splined shaft 50. A tubular head member 52 is secured to the upper end portion of the shaft 50 and supports a horizontally projecting tubular transfer arm 54. For purpose of illustration, the transfer arm 54 supports a depending bracket or fixture 56 which carries a set of opposing fluid actuators 58 and 59 having retractable and extendable gripping elements or pins 61 and 62, respectively. The gripping pins 61 and 62 are constructed to engage or pick up a relatively heavy article such as an engine block B. The gripping cylinders 58 and 59 are actuated by pressurized fluid supplied through flexible fluid or air lines 64. A single acting fluid or air cylinder 66 is pivotally supported and has a piston rod 67 pivotally connected to the crank arm 44 eccentrically of the axis of the shaft 42. The cylinder 66 provides for counter-balancing the weight of the arm 44, shaft 50, head member 52, transfer arm 54, and fixture 56 as well as the weight of the article being transferred in order to minimize the stresses on the cam 32 and the cam follower 38.

The output shaft of the other clutch-brake unit 10 on the left in FIG. 1, is connected by a flexible drive coupling (not shown) to the input shaft of another gear reducer 70 having an upwardly projecting output shaft 71 supporting a crank member or plate 72. The output shaft 71 also drives another solid state rotary cam switch or position indicator 74 through an endless timing belt drive 76. In the one prototype assembly, the gear reducer 70 had a reduction of 40:1. A series of holes 78 are formed within the crank plate 72 with each hole being located at a different radius from the center axis of the shaft 71. A vertical crank pin 81 is selectively inserted into one of the holes 78 and forms a pivot connection for a crank arm 82 to the crank plate 72. The crank arm 82 supports an elongated linear gear or rack 84 which engages a pinion 86 mounted on the splined shaft 50 for rotation therewith while the shaft 50 moves axially within the pinion 86.

In operation of the apparatus described above in reference to the drawing, the fluid actuated non-rotating piston within the clutch-brake unit 12 shown on the right in FIG. 1, is actuated to engage the clutch or alternately apply the brake for controlling the vertical movement of the shaft 50 within predetermined limits, for example, within a travel distance of sixteen inches. The position indicator 34 provides a feed back control signal to the control for the solenoid valves within the air lines connected to actuate the non-rotating piston within the clutch-brake unit so that precision vertical movement of the shaft 50 may be obtained. By interchanging cam members 32 on the shaft 31, the extent and rate of vertical movement of the shaft 50 and head member 52 may be selected according to the requirements for successively transferring a supply of articles. For example, the article pick up station may be at an elevation higher than the article deposit station, or vice versa, or the stations may be at the same elevation. The fluid or air pressure to the counter-balancing cylinder 66 may also be adjusted according to the weight of the articles being transferred.

It is also apparent that the limits of oscillation of the shaft 50 may be precisely selected by controlling the engagement of the clutch or brake within the clutch-brake unit 10 shown at the left in FIG. 1 and by using the rotary cam switch 74 to provide a feed back signal according to the desired angular movements of the shaft 50 and head member 52. The maximum angle of oscillation of the shaft 50 and head member 52 is selected by selection of the hole 78 within the crank plate 72 for receiving the crank pin 81.

From the drawing and the above description, it is apparent that apparatus constructed in accordance with the present invention, provides desirable features and advantages. As one primary advantage, the two clutch-brake units 10 provide for separately and precisely controlling the linear movement and oscillation of the head member 52. The units 10 also provide for high dependability and reliability by being able to perform many hundred thousands of cycles without requiring down time for servicing. The apparatus is also adapted for handling or transferring relatively heavy articles. For example, one transfer system which was constructed and tested, was effective to transfer articles weighing one thousand poinds by a vertical distance of twelve inches, a rotary angle of one hundred eighty degrees all within a time period of one and one-half seconds. The combination of the continuously operating electric motor 25 with the two clutch-brake units 10 provides for quickly starting and stopping the shafts 31 and 71 with precision timing so that the transfer time for each article is minimized. The crank plate 72 and pin 81 also provide for desirable harmonic oscillation of the shaft 50, and the profile on the cam member 32 may be made to provide reciprocation of the shaft 50 with the desired acceleration and deceleration.

While the form of apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. Apparatus for producing compound movement of a head member and adapted for quickly and successively transferring a supply of heavy articles, said apparatus comprising a first clutch-brake unit and a second clutch-brake unit each including a housing confining a cooling fluid and rotatably supporting an input drive member and a coaxial output drive member, each said housing enclosing means including a set of interfitting annular clutch plates and discs for connecting the corresponding said input drive member to the coaxial said output drive member, each said housing also enclosing means including a set of interfitting annular brake plates and discs for connecting the corresponding said output drive member to said housing, each said housing further enclosing axially movable actuating means for selectively engaging said clutch plates and discs and said brake plates and discs, means for continuously driving said input drive member of each said clutch-brake unit, an elongated shaft supporting said head member, first drive means for moving said shaft axially in response to rotation of said output drive member of one of said clutch-brake units, second drive means for rotating said shaft in response to rotation of said output drive member of the other said clutch-brake unit, and said actuating means within each said clutch-brake unit being independently movable for adjustably selecting rotation and linear movement of said shaft and said head member.

2. Apparatus as defined in claim 1 wherein said first drive means include a gear reducer having a driven output shaft supporting a rotary cam member, a cam follower engaging said cam member and connected to an arm, bearing means connecting said arm to said shaft, said cam follower and said arm being supported for oscillation in response to rotation of said cam member, and said shaft being movable axially in response to oscillation of said arm and said cam follower.

3. Apparatus as defined in claim 1 wherein said shaft is splined, said second drive means include a rotary drive member mounted on said splined shaft for rotation therewith while permitting axial movement of said shaft within said rotary drive member, means for oscillating said rotary drive member, and said first drive means is effective to move said splined shaft axially within said rotary drive member.

4. Apparatus as defined in claim 1 wherein said second drive means include a gear reducer having a rotary output member supporting a crank member, and means for oscillating said shaft supporting said head member in response to rotation of said crank member.

5. Apparatus as defined in claim 4 wherein said shaft is splined said means for oscillating said shaft comprise a pinion mounted on said shaft for rotation therewith and for axial movement of said shaft within said pinion, and a rack member engaging said pinion and connected to said crank member for oscillating said pinion and said shaft in response to rotation of said crank member.

6. Apparatus as defined in claim 1 wherein said fluid control means comprise a set of rotary actuated switches connected to sense the rotation of said output drive member of each said clutch-brake unit.

7. Apparatus as defined in claim 1 wherein said means for continuously driving said input drive member of each said clutch-brake unit comprise an electric motor having a motor shaft, and belt drive means connecting said motor shaft to both of said input drive members of said clutch-brake units.

8. Apparatus as defined in claim 1 wherein said input drive member and said output drive member for each said clutch-brake unit comprise axially aligned input and output shafts rotatably supported by said housing.

9. Apparatus as defined in claim 1 wherein each said clutch-brake unit includes means responsive to rotation of one of said drive members for pumping said cooling fluid outwardly between said clutch plates and discs and between said brake plates and discs.

10. Apparatus as defined in claim 1 wherein said shaft is generally vertical, said first drive means including an oscillating arm connected to said shaft for moving said shaft generally vertically, and fluid cylinder actuated means connected to said arm for counter-balancing the weight of said shaft and said head member and a load supported by said head member.

11. Apparatus for producing compound movement of a head member and adapted for quickly and successively transferring a supply of heavy articles, said apparatus comprising a first clutch-brake unit and a second clutch-brake unit each including a housing confining a cooling fluid and rotatably supporting an input drive shaft and an aligned output drive shaft, each said housing enclosing means including a set of interfitting annular clutch plates and discs for connecting the corresponding said input drive shaft to the aligned said output drive shaft, each said housing also enclosing means including a set of interfitting annular brake plates and discs for connecting the corresponding said output drive shaft to said housing, each said housing further enclosing an axially movable fluid actuated non-rotatable piston for selectively engaging said clutch plates and discs and said brake plates and discs, motor means for continuously driving said input drive shaft of each said clutch-brake unit, a generally vertical support shaft supporting said head member, first drive means including a gear reducer for moving said support shaft axially in response to rotation of said output drive shaft of one of said clutch-brake units, second drive means including a gear reducer for oscillating said support shaft in response to rotation of said output drive shaft of the other said clutch-brake unit, and said piston within each said clutch-brake unit housing being independently movable for adjustably selecting oscillation and axial movement of said support shaft and said head member.

12. Apparatus as defined in claim 11 wherein said first drive means includes a rotary cam member driven by the corresponding said gear reducer, a cam follower engaging said cam member and connected to an arm, bearing means connecting said arm to the lower end portion of said support shaft, said cam follower and said arm being supported for oscillation in response to rotation of said cam member, and said support shaft being movable axially in response to oscillation of said arm and said cam follower.

13. Apparatus as defined in claim 11 wherein said support shaft is splined, said second drive means includes a pinion mounted on said splined support shaft for rotation therewith while permitting axial movement of said support shaft within said pinion, said second drive means includes a crank member driven by the corresponding said gear reducer, and a rack member engaging said pinion and connected to said crank member for oscillating said pinion and said support shaft in response to rotation of said crank member.

14. Apparatus as defined in claim 11 wherein said means for continuously driving said input drive shaft of each said clutch-brake unit comprise an electric motor having a motor shaft, and an endless drive connecting said motor shaft to both of said input drive shafts of said clutch-brake units.

* * * * *